United States Patent
Steinberg

(10) Patent No.: US 8,561,374 B2
(45) Date of Patent: Oct. 22, 2013

(54) ARTICLE OF MANUFACTURE FOR WOOD CONSTRUCTION

(76) Inventor: Dov Steinberg, Katzir (IL)

( * ) Notice: Subject to any disclaimer, the term of this patent is extended or adjusted under 35 U.S.C. 154(b) by 0 days.

(21) Appl. No.: 13/195,296

(22) Filed: Aug. 1, 2011

(65) Prior Publication Data

US 2013/0034717 A1  Feb. 7, 2013

(51) Int. Cl.
E04C 3/00 (2006.01)

(52) U.S. Cl.
USPC .......................................................... 52/847

(58) Field of Classification Search
USPC ..................... 52/847, 653.1, 656.1, 656.2
See application file for complete search history.

(56) References Cited

U.S. PATENT DOCUMENTS

| | | | |
|---|---|---|---|
| 3,106,752 A * | 10/1963 | Hannen | 52/843 |
| 3,161,267 A * | 12/1964 | Keller | 428/120 |
| 4,127,929 A | 12/1978 | Zapara et al. | |
| 4,638,619 A | 1/1987 | Fischetti | |
| 4,677,806 A * | 7/1987 | Tuomi | 52/656.1 |
| 5,333,426 A | 8/1994 | Varoglu | |
| 6,003,280 A | 12/1999 | Wells | |
| 6,050,047 A * | 4/2000 | Covelli et al. | 52/847 |
| 6,051,301 A * | 4/2000 | Tingley | 428/106 |
| 6,357,195 B1 * | 3/2002 | Chen | 52/668 |
| 6,446,412 B2 * | 9/2002 | Mathis | 52/847 |
| 6,530,180 B2 * | 3/2003 | Edmondson et al. | 52/105 |
| 6,534,143 B1 | 3/2003 | Thoma | |
| 6,641,893 B1 * | 11/2003 | Suresh et al. | 428/105 |
| 6,772,572 B2 * | 8/2004 | Henthorn | 52/847 |
| 7,338,701 B2 * | 3/2008 | Yokoo et al. | 428/212 |
| 2003/0115828 A1 * | 6/2003 | Li | 52/730.7 |
| 2008/0047225 A1 * | 2/2008 | Kawai et al. | 52/796.1 |
| 2009/0205287 A1 * | 8/2009 | Sauteraud | 52/656.2 |
| 2010/0275551 A1 * | 11/2010 | Hofmann | 52/847 |

* cited by examiner

*Primary Examiner* — Mark Wendell
*Assistant Examiner* — Keith Minter
(74) *Attorney, Agent, or Firm* — Haim M. Factor

(57) ABSTRACT

An article of manufacture for wood construction, comprising: a plurality of layers facially attached to each other, each layer comprising a plurality of primary wood members, each neighboring two of the primary wood members being connected by a plurality of connecting wood members, each connecting wood member extending between the two neighboring primary wood members, each one of the layers being oriented with each primary wood member of the layer overlapping a plurality of respective connecting wood members of a neighboring one of the layers.

9 Claims, 6 Drawing Sheets

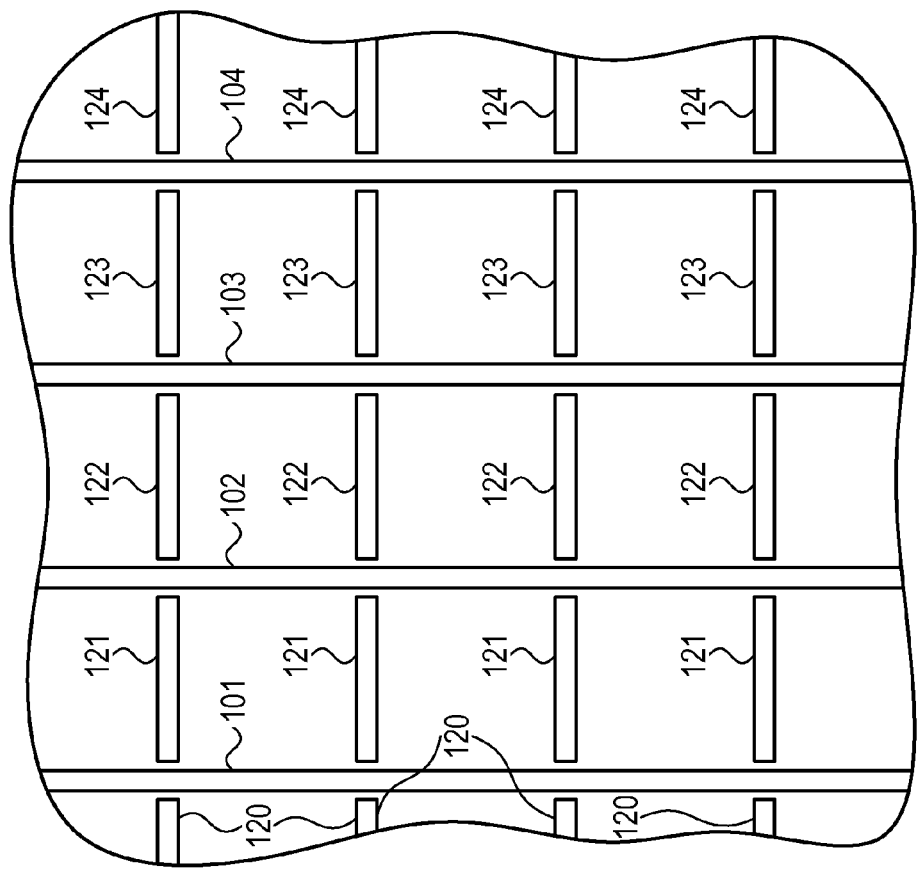
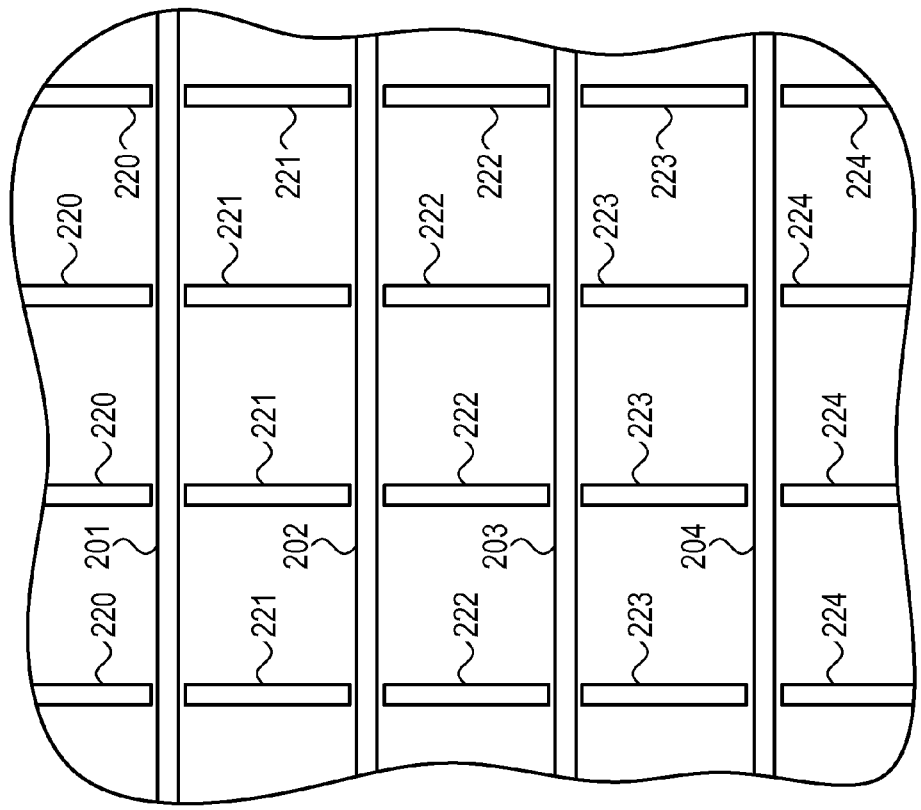

ARTICLE OF MANUFACTURE FOR WOOD CONSTRUCTION

FIELD AND BACKGROUND OF THE INVENTION

The present invention relates to wood construction and, more particularly, but not exclusively to an article of manufacture for wood construction.

Wood construction has been in use all over the world, for many centuries.

Throughout history, wood has found favor as a building material due to its strength, economy, workability, and beauty, and its ability to last has been demonstrated again and again. From the ancient temples of Japan and the great stave churches of Norway to the countless historic North American buildings, wood construction has proven it can stand the test of time.

Wood construction has traditionally involved a variety of framing methods, also known as light-frame construction methods, and framework construction methods.

Generally, the framing methods are wood building techniques based around structural members, usually referred to as studs.

A stud functions as a load-bearing wall, which bears a load (say a floor of a building) resting upon the stud, by conducting the load's weight to a building's foundation.

The studs provide a stable frame to which interior and exterior wall coverings made of non-supporting or inadequately supporting materials, forming wall parts also referred to as curtain walls, are attached.

Studs are expensive members, built of high quality and expensive wood, and usable for heavy load bearing.

The studs include vertical and horizontal members of exterior walls and interior partitions such as wall plates and lintels. The studs serve as a nailing base for covering material, and support the upper floors and roof.

Exterior wall studs include vertical wood members to which the wall sheathing and cladding are attached. The exterior wall studs may further include horizontal wood members also referred to hereinbelow as 'beams', say horizontal load-bearing walls fitted on a building foundation layer made of concrete or steel.

The studs are supported on a bottom plate or foundation sill and in turn, support the top plate. In tall framed buildings, studs are usually augmented by substantial posts, especially in corners or mid-points of long walls.

The framing methods have occasionally included use of light prefabricated elements, which are arranged as wall or ceiling elements, and are mounted at construction sites.

The prefabricated elements have included light building boards made of wood wool, wood fibers, or wood chips. Such light building boards are only suitable as facing tiles, not as supporting elements.

The prefabricated elements have also included frames covered with cover panels and filled with insulating material. Such elements are also not suitable as supporting elements.

SUMMARY OF THE INVENTION

According to one aspect of the present invention, there is provided an article of manufacture for wood construction, comprising: a plurality of layers facially attached to each other, each layer comprising a plurality of primary wood members, each neighboring two of the primary wood members being connected by a plurality of connecting wood members, each connecting wood member extending between the two neighboring primary wood members, each one of the layers being oriented with each primary wood member of the layer overlapping a plurality of respective connecting wood members of a neighboring one of the layers.

According to a second aspect of the present invention, there is provided a method for wood construction, comprising: assembling a plurality of layers, each layer being assembled by the steps of: a) arranging a plurality of primary wood members, and b) connecting each neighboring two of the primary wood members by a plurality of connecting wood members, each connecting wood member extending between the two neighboring primary wood members; and facially attaching the layers, oriented with each primary wood member of a respective one of the layers overlapping a plurality of respective connecting wood members of a neighboring one of the layers.

According to a third aspect of the present invention, there is provided a method for wood construction, comprising: connecting a plurality of articles of manufacture, each one of the articles of manufacture comprising a plurality of layers facially attached to each other, each layer comprising a plurality of primary wood members, each neighboring two of the primary wood members being connected by a plurality of connecting wood members, each connecting wood member extending between the two neighboring primary wood members, each one of the layers being oriented with each primary wood member of the layer overlapping a plurality of respective connecting wood members of a neighboring one of the layers.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings:

FIG. 1 is a block diagram schematically illustrating a first exemplary layer of a first article of manufacture for wood construction, according to an exemplary embodiment of the present invention.

FIG. 2 is a block diagram schematically illustrating a second exemplary layer of the first article of manufacture for wood construction, according to an exemplary embodiment of the present invention.

DESCRIPTION OF THE PREFERRED EMBODIMENTS

Figure 3:
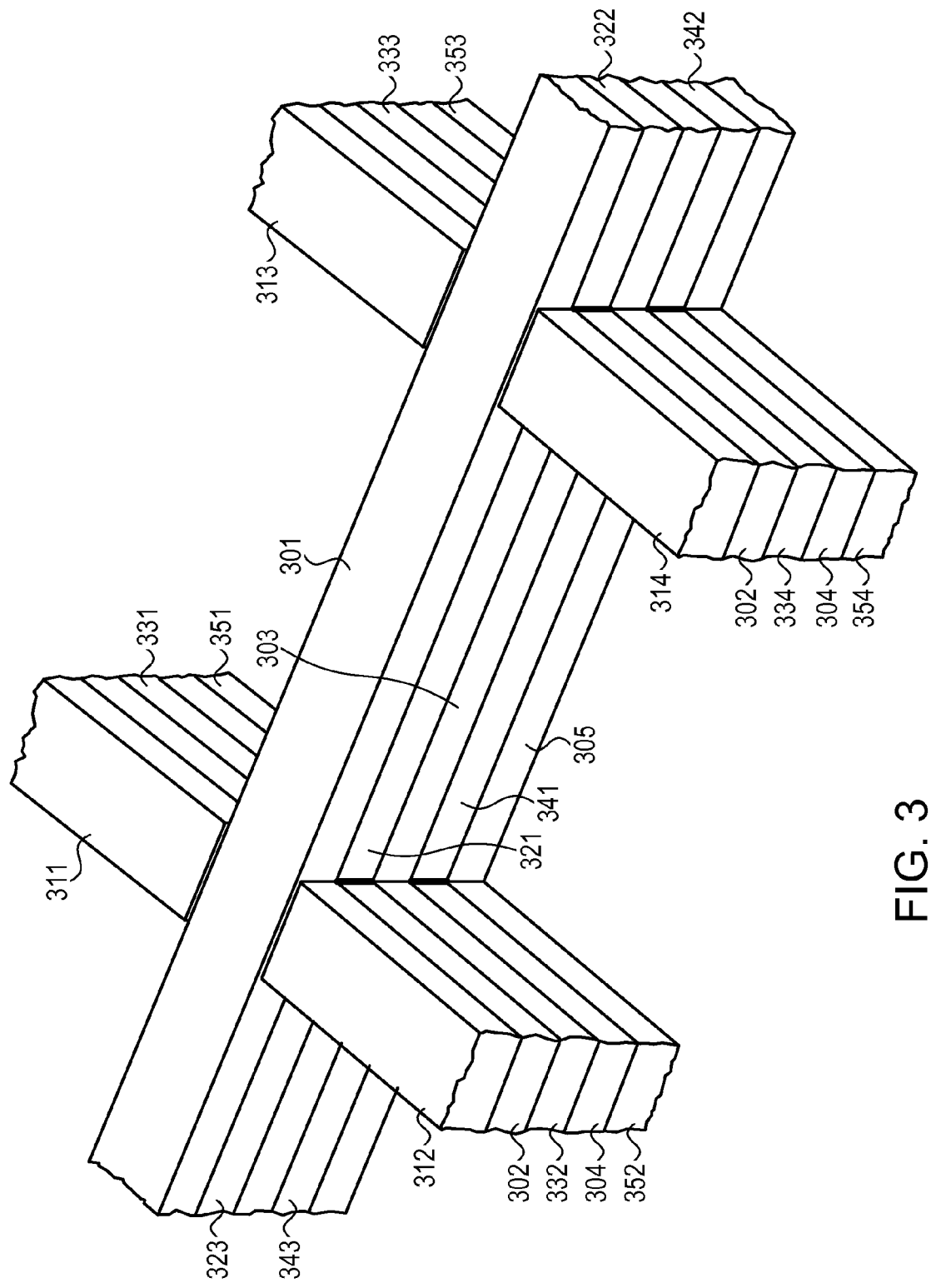
FIG. 3 is a block diagram schematically illustrating a cross-sectional side view of a portion of a second exemplary article of manufacture for wood construction, according to an exemplary embodiment of the present invention.

The present embodiments comprise an article of manufacture and methods, for wood construction.

According to an exemplary embodiment of the present invention, there is provided an article of manufacture for wood construction, a method for manufacturing the article, and a method for constructing a building using the article of manufacture.

An exemplary article of manufacture, made according to an exemplary embodiment of the present invention, includes several layers, facially attached to each other, say using a contact adhesive or fasteners. The layers may be attached to form a wall, a floor, a roof, etc., as described in further detail hereinbelow.

Each layer includes several wood members arranged in the layer.

More specifically, the layer includes two or more primary wood members.

Each neighboring two of the primary wood members are connected by two or more connecting wood members. Each connecting wood member extends between the two neighboring primary wood members.

The layers are facially attached, such that each of the layers is oriented with each primary wood member of the layer overlapping respective connecting wood members of a neighboring one of the layers, as described in further detail hereinbelow.

That is to say that the article of manufacture includes several layers oriented with a similar facial cross-section, which alternates among the layers, such that each primary wood member of a first one of the layers overlaps respective connecting wood members of a second neighboring one or two of the layers. Optionally, each of the layers is oriented in a rotational orientation perpendicular to one or two neighboring ones of the layers, as described in further detail hereinbelow.

The primary wood member of the first layer extends in direction of extension of each one of the connecting wood members of the second layer, overlapped by the primary wood member, between the two primary wood members connected by the overlapped connecting wood member. That is to that the overlapped connecting wood members extend in a same direction as the primary wood member which overlaps the connecting wood members, as described in further detail hereinbelow.

Similarly, each of the second layer's primary wood members overlaps respective connecting wood members of the first layer.

The primary wood member of the second layer extends in direction of extension of each one of the connecting wood members of the first layer, overlapped by the primary wood member, between the two primary wood members connected by the overlapped connecting wood member, as described in further detail hereinbelow. That is to say that the overlapped connecting wood members of the first layer extend in a same direction as the primary wood member of the second layer, which overlaps the connecting wood members, as described in further detail hereinbelow.

Optionally, the wood members in each of the layers are arranged in parallel or in perpendicular to each other.

However, the wood members may be also be arranged in any other way (i.e. in any angle to each other, in a distance from each other, which changes among different members, etc.), provided primary wood members of each of the layers overlap connecting wood members of neighboring layers (i.e. layers that are facially attached to the layer).

The overlapped connecting wood members of the neighboring layer extend between respective primary wood members connected by the overlapped connecting members, in direction of extension of the primary wood member which overlaps the connecting wood members. That is to say that the overlapped connecting wood members of the neighboring layer extend in a same direction as the primary wood member which overlaps the connecting wood members, as described in further detail hereinbelow.

Potentially, the multi-layered design of the present exemplary article of manufacture strengthens the article, and introduces load-bearing qualities to the article.

Using articles of manufacture, as taught by the present application, there may be introduced a method alternative to traditional framing methods. The alternative method may be carried out without the expensive studs that traditional framing methods are based on, as the articles of manufacture themselves, carry the load bearing qualities.

The principles of a method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1, which is a block diagram schematically illustrating a first exemplary layer of an article of manufacture for wood construction, according to an exemplary embodiment of the present invention.

An exemplary article of manufacture for wood construction, according to an exemplary embodiment of the present invention, includes a few layers that are facially attached to each other.

FIG. 1 schematically illustrates a first exemplary one of the article's layer.

The first layer includes several primary wood members 101-104.

Optionally, the primary wood members are longitudinal wood members 101-104, as illustrated using FIG. 1.

Optionally, the primary wood members 101-104 are parallel or nearly parallel to each other.

Each neighboring two of the primary wood members 101-104 are connected by two or more connecting wood members 121-123. For example, the left-most primary wood members 101 and 102 are connected by at least four connecting wood members 121.

Each specific one of the connecting wood member 121-123 extends between respective two neighboring ones of the primary wood members 101-104, connected by the specific wood member.

For example, each one of connecting wood members 121 expends between the left-most primary wood members 101 and 102, and connects the two primary wood members 101, 102.

Optionally, the connecting wood members 121-123 that extend between the respective neighboring primary wood members 101-104, say the connecting wood members 121 between the left-most primary wood members 101 and 102, are parallel or nearly parallel to each other.

Optionally, the connecting wood members 121-123 that extend between the respective neighboring primary wood members 101-104, say the connecting wood members 121 between the left-most primary wood members 101 and 102, are perpendicular or nearly perpendicular to the respective primary wood members.

Each one of the connecting wood members 121-123 that extend between the neighboring primary wood members 101-104, may be attached to the respective neighboring primary wood members 101-104, using an adhesive (say a contact adhesive or any other suitable glue, as known in the art), using one or more fasteners, using any other known in the art method, or using any combination thereof.

Additional connecting wood members 120, 124, connect primary wood members 101 and 104, to neighboring primary wood members (not shown) positioned next to primary wood members 101 and 104, respectively.

Reference is now made to FIG. 2, which is a block diagram schematically illustrating a second exemplary layer of the first exemplary article of manufacture for wood construction, according to an exemplary embodiment of the present invention.

The exemplary article of manufacture for wood construction, a first layer of which is illustrated using FIG. 1, includes a few parallel or nearly parallel layers that are facially attached to each other, as described in further detail hereinabove.

FIG. 2 schematically illustrates a second exemplary one of the first exemplary article's layers, which is a layer facially attached to the first layer.

The second layer includes several primary wood members 201-204.

Optionally, the primary wood members 201-204 are arranged in a widthwise manner, as illustrated using FIG. 2.

Optionally, the primary wood members 201-204 are parallel or nearly parallel to each other.

Each neighboring two of the primary wood members 201-204 are connected by two or more connecting wood members 221-223. For example, the upper-most primary wood members 201 and 202 are connected by at least four connecting wood members 221.

Each specific one of the connecting wood member 221-223 extends between respective two neighboring ones of the primary wood members 201-204, connected by the specific wood member.

For example, each one of connecting wood members 221 expends between the upper-most primary wood members 201 and 202, and connects the two primary wood members 201 and 202.

Optionally, the connecting wood members 221-223 that extend between the respective neighboring primary wood members 201-204, say the connecting wood members 221 between the upper-most primary wood members 201 and 202, are parallel or nearly parallel to each other.

Optionally, the connecting wood members 221-223 that extend between the respective neighboring primary wood members 201-204, say the connecting wood members 221 between the upper-most primary wood members 201 and 202, are perpendicular or nearly perpendicular to the respective primary wood members.

Each one of the connecting wood members 221-223 that extend between the neighboring primary wood members 201-204, may be attached to the respective neighboring primary wood members 201-204, using an adhesive (say a contact adhesive or any other suitable glue, as known in the art), using one or more fasteners, using any other known in the art method, or using any combination thereof.

Additional connecting wood members 220, 224, connect primary wood members 201 and 204, to neighboring primary wood members (not shown) positioned next to primary wood members 201 and 204, respectively.

The exemplary article of manufacture includes three or more layers.

Each layer is facially attached to a preceding one of the layers (say one on top of the other), thus forming the article of manufacture which is multi-layered.

The layers are attached, such that each of the layers is oriented with each primary wood member of the layer in overlap with respective connecting wood members of a neighboring one or two of the layers, as described in further detail hereinabove.

More specifically, the article of manufacture may include several layers oriented with a similar facial cross-section, which alternates among the layers, such that each primary wood member of a first one of the layers overlaps or nearly overlaps, respective connecting wood members of a second neighboring one or two of the layers.

Similarly, each one of the second layer's primary wood members overlaps, or nearly overlaps, respective connecting wood members of the first layer.

The wood members in each of the layers of FIGS. 1-2 are depicted arranged in parallel or in perpendicular to each other. Each of the two layers depicted in FIGS. 1-2 is oriented in a rotational orientation perpendicular to the other layer.

The exemplary article of manufacture may thus include several layers, attached to the other, using an adhesive, such as a contact adhesive, or another adhesive, as described in further detail hereinbelow.

The layers may be attached to form a wall, a floor, a roof, etc, as described in further detail hereinbelow.

Optionally, the first and remaining odd layers' wood members are arranged and connected, as depicted using FIG. 1, and the second and remaining even layer's (i.e. each layer sandwiched between two odd layers) wood members are arranged and connected as depicted using FIG. 2. That is to say that each one of the layers is rotationally oriented perpendicularly to a neighboring one or two of the layers, which is facially attached to the layer.

It is noted that the wood members in each layer, may also be arranged in any other way (i.e. in any angle to each other, and in any distance from each other), provided primary wood members of each of the layers overlap connecting wood members of neighboring layers (i.e. layers that are facially attached to the layer).

Each one of the overlapped connecting wood members of the neighboring layer extends between the primary wood members connected by the connecting wood member, in direction of extension of the primary wood member which overlaps the connecting wood members, as described in further detail hereinbelow. That is to say that the overlapped connecting wood members of the neighboring layer extend in a same direction as the primary wood member which overlaps the connecting wood members, as described in further detail hereinbelow.

The article of manufacture may be designed according to a variety of aesthetic, functional, mechanical constraints, or any combination thereof, with any angle or distance between wood members. For example, the article of manufacture may be designed as a wall, as a well with a window, as wall with a door, as a roof, as a floor, etc. as described in further detail hereinbelow.

Potentially, the multi-layered design of the present exemplary article of manufacture strengthens the article, and introduces load-bearing qualities to the article.

Using the exemplary article of manufacture, there may be introduced a method alternative to traditional framing methods.

The alternative method may be carried out without the expensive studs that traditional framing methods are based on, as the articles of manufacture themselves, carry the load bearing qualities.

The strength of the exemplary article of manufacture may further strengthen a wood structure built using the exemplary article, against changes and distortions caused by moisture, temperature changes, winds, etc.

The changes and distortions are known to cause cracks in wood houses (especially in wall coverings made of non-supporting or inadequately supporting materials, such as plaster or plywood), built using traditional framing methods, Reference is now made to FIG. 3, which is a block diagram schematically illustrating a cross-sectional side view of a portion of a second exemplary article of manufacture for wood construction, according to an exemplary embodiment of the present invention.

An exemplary article of manufacture for wood construction, according to an exemplary embodiment, includes a first and top-most layer, in which each one of two or more primary elongated wood members 301 (only one shown) is connected to respective one or two neighboring primary elongated wood members (not shown).

The primary elongated wood member 301 is connected to the neighboring primary elongated wood members, by connecting wood members 311-314. Each of the connecting wood members 311-314 expends between the primary member 301, and a respective one of the primary member's 301 neighboring primary wood members, as described in further detail hereinabove The first layer is deployed on, and is facially attached to a second, neighboring layer, using an adhesive (say by gluing).

The second layer includes primary wood members 302 (only two shown), connected to each other, by connecting wood members 321 (only one shown). The connecting wood members 321 expend between the second layer's primary wood members 302.

The second layer further includes additional connecting wood members 322, 323. Each of the additional wood members 322, 323 connects a respective one of the primary wood members 302 to another primary wood members (not shown), positioned to the right and left, respectively.

Each primary wood member 301 of the first and top-most layer overlaps the connecting wood members 321-323 of the second layer. Similarly, each one of the primary wood members 302 of the second layer overlaps respective ones of the connecting wood members 311-312, 313-314 of the first and top-most layer.

The second layer is deployed on, and is facially attached to a third, neighboring layer, using an adhesive (say by gluing), fasteners, etc.

The third layer includes two or more primary elongated wood members 303 (only one shown). Each one of the primary elongated wood members 303 is connected to two neighboring primary elongated wood members (not shown).

The primary elongated wood member 303 is connected to the neighboring primary elongated wood members, by connecting wood members 331-334. Each of the connecting wood members 331-334 expends between the primary member 301, and a respective one of the primary member's 303 neighboring primary wood members, as described in further detail hereinabove.

Each primary wood member 303 of the third layer overlaps the connecting wood members 321-323 of the second layer. Similarly, each of the primary wood members 302 of the second layer overlaps respective ones of the connecting wood members 331-332, 333-334 of the third layer.

Similarly, each primary wood member 304 of a fourth layer positioned under the third layer, overlaps respective connecting wood members 331-332, 333-334 of the third layer, and each of the primary wood members 303 of the third layer overlaps connecting wood members 341-343 of the fourth layer.

Further, each primary wood member 304 of a fourth layer positioned under the third layer, overlaps respective connecting wood members 351-352, 353-354 of a fifth layer, and each of the primary wood members 305 of the fifth layer overlaps connecting wood members 341-343 of the fourth layer.

An article of manufacture, according to an exemplary embodiment of the present invention, may serve as a prefabricated wall, floor, roof, etc, as described in further detail hereinbelow, and illustrated using FIG. 4-6.

Figure 4:
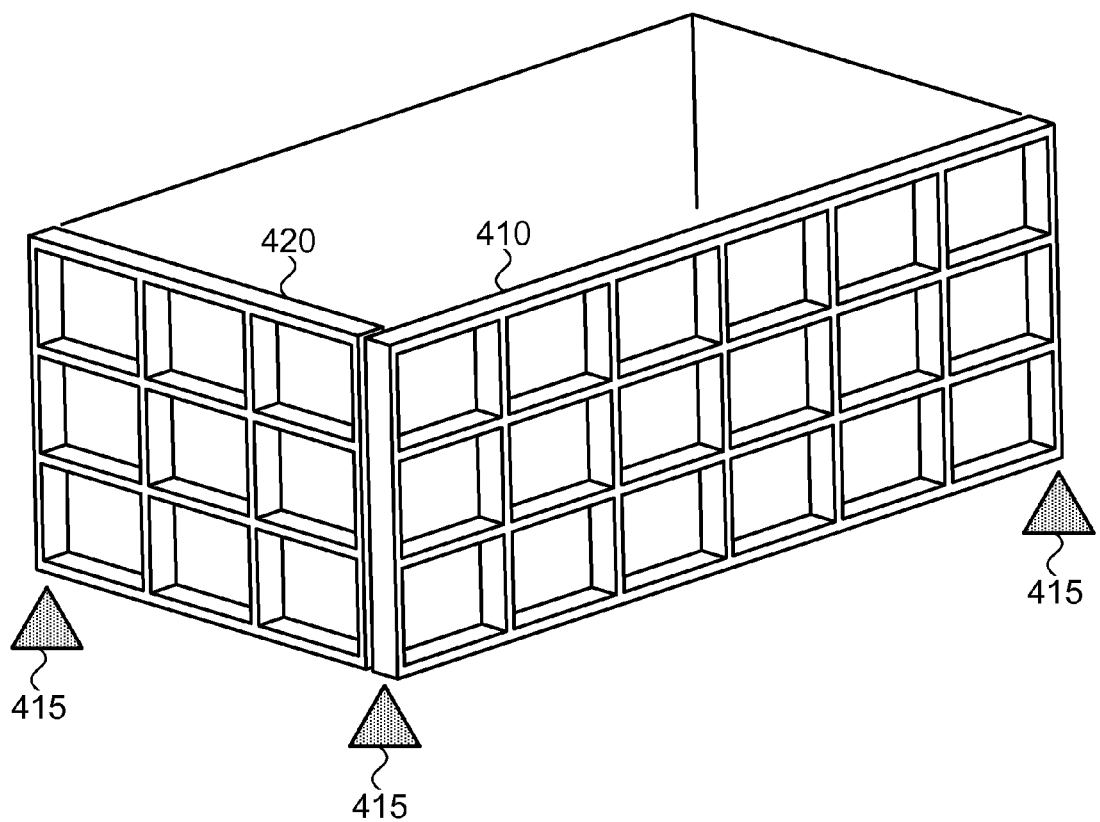
FIG. 4 is a block diagram schematically illustrating a third article of manufacture for wood construction, according to an exemplary embodiment of the present invention.

Reference is now made to FIG. 4, which is a block diagram schematically illustrating a third article of manufacture for wood construction, according to an exemplary embodiment of the present invention.

An exemplary article of manufacture, according to an exemplary embodiment of the present invention, may serve as a prefabricated external wall 410.

The layers of the prefabricated external wall 410 may give the wall 410 load bearing qualities, as described in further detail hereinabove.

Consequently, a wood building may be built by positioning the prefabricated external wall 410 directly on foundations of the building, say directly on spot footings 415, rather than on dedicated horizontal studs (also referred to hereinbelow as 'beams') that serve as a basis, on top of a foundation of a house built using traditional wood framing methods.

The prefabricated external wall 410 on one side of the building may be attached (say using adhesive glue) to a prefabricated external wall 420 on a second side of the building, which is also positioned on the spot footing 415, as known in the art.

The strength of the prefabricated external walls 410, 420 may also provide side wind protection, thus avoiding a need to strengthen the wood building with diagonal wind braces (that are also typical of traditional wood framing methods).

Figure 5:
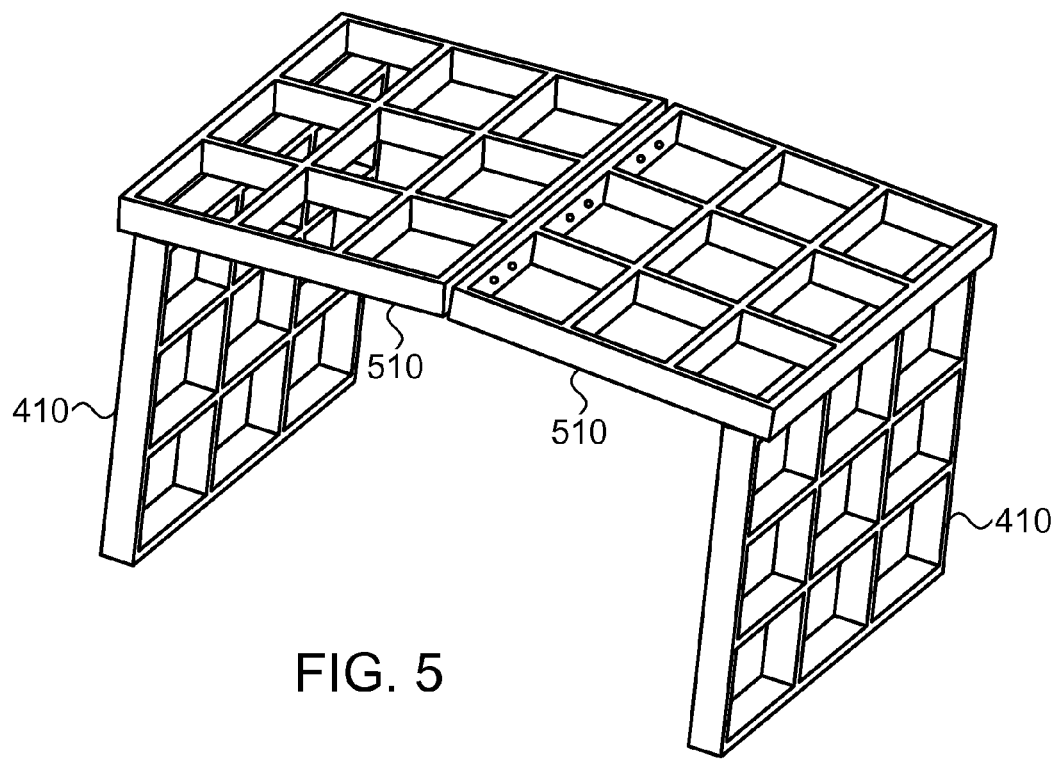
FIG. 5 is a block diagram schematically illustrating a fourth article of manufacture for wood construction, according to an exemplary embodiment of the present invention.

Reference is now made to FIG. 5, which is a block diagram schematically illustrating a fourth article of manufacture for wood construction, according to an exemplary embodiment of the present invention.

The article of manufacture which serves as a prefabricated external wall 410 may also be connected to an article of manufacture 510, used as a part of a roof.

The articles of manufacture 410, 510, may be connected in a specific angle, as prescribed by a construction engineer or architect, say for a specific building, as described in further detail hereinbelow.

The prefabricated articles of manufacture 510 used as the roof parts, may also be used as an alternative to planar trusses which consist of several rafters and ceiling joists, and are typical of roof building using traditional wood framing methods.

Figure 6:
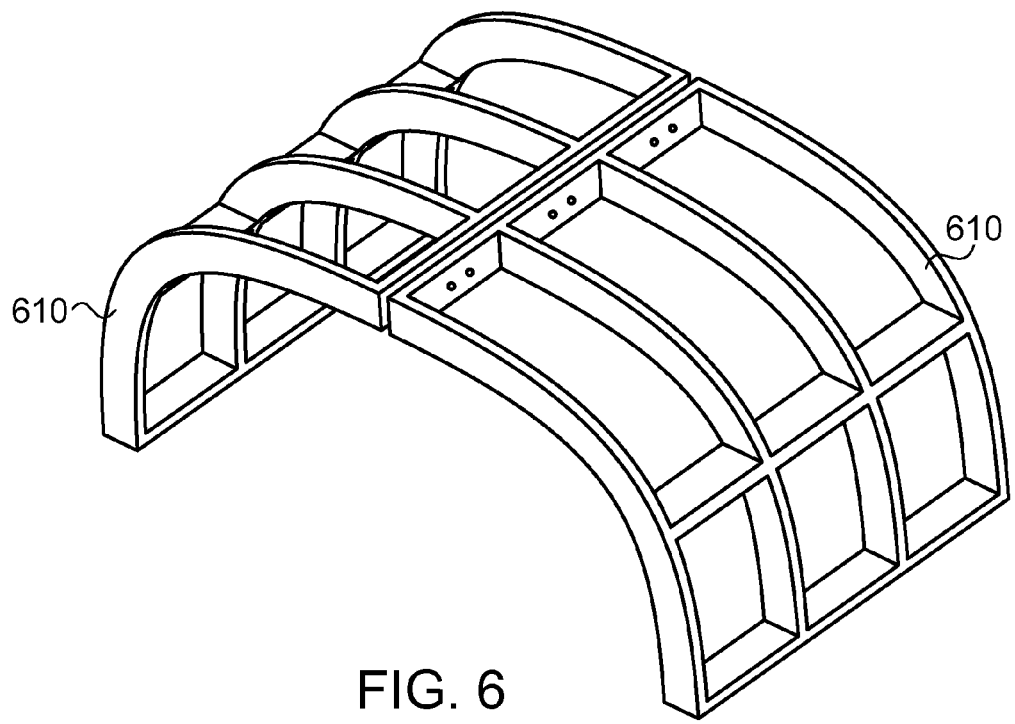
FIG. 6 is a block diagram schematically illustrating a fifth article of manufacture for wood construction, according to an exemplary embodiment of the present invention.

Reference is now made to FIG. 6 which is a block diagram schematically illustrating a fifth article of manufacture for wood construction, according to an exemplary embodiment of the present invention.

Exemplary arch-shaped articles of manufacture 610, according to an exemplary embodiment of the present invention, may serve as prefabricated external walls that also form a roof, when connected together, to build a wood house.

The prefabricated external walls 610 have both load bearing and wind protection qualities, as described in further detail hereinabove.

Consequently, both a need to strengthen the wood house with diagonal wind braces against wind, and a need to use horizontal studs (i.e. beams), as a load-bearing basis on top of house foundations, and under walls of the house, may be avoided. The two needs that may be avoided are typical of traditional wood framing methods.

The prefabricated walls 610 may also be used as an alternative to planar trusses which consist of several rafters and ceiling joists, and are typical of roof building using traditional wood framing methods.

Figure 7:
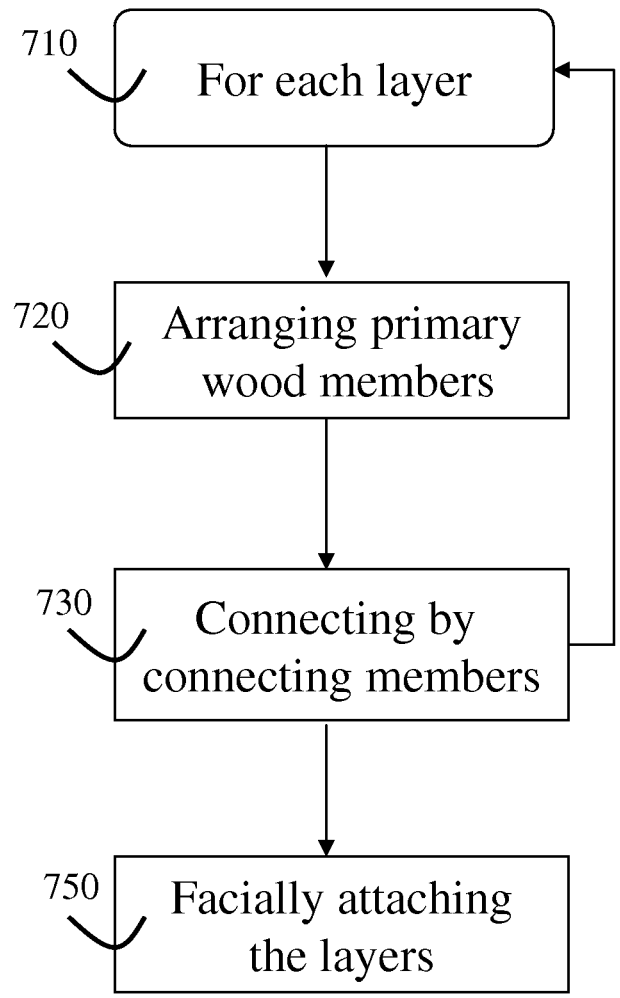
FIG. 7 is a flowchart illustrating a first exemplary method for wood construction, according to an exemplary embodiment of the present invention.

Reference is now made to FIG. 7, which is a flowchart illustrating a first exemplary method for wood construction, according to an exemplary embodiment of the present invention.

A first exemplary method for wood construction, according to an exemplary embodiment of the present invention, includes assembling 710 a plurality of layers.

Each layer is assembled 710 by the steps of:
a) Arranging 720 two or more primary wood members; and
b) Connecting 730 each neighboring two of the arranged 720 primary wood members by two or more connecting wood members, such that each connecting wood member extends between the two neighboring primary wood members.

The assembled 710 layers are facially attached 750 to each other, oriented with each primary wood member of a respective one of the layers, overlapping or nearly overlapping two or more of respective connecting wood members of a neighboring one of the layers (i.e. a layer facially attached to the layer), as described in further detail hereinabove.

Each one of the overlapped connecting wood members of the neighboring layer extends between primary wood members, connected by the overlapped connecting wood member, in direction of extension of the primary wood member which overlaps the connecting wood member.

Each one of the connecting wood members that extend between the two neighboring primary wood members, is attached to the respective neighboring primary wood members, using an adhesive (be it a contact adhesive or any other suitable glue, as known in the art), using one or more fasteners, using any other known in the art method, or using any combination thereof.

Optionally, the primary wood members of each one of the layers are arranged 720 in parallel or nearly in parallel, to each other.

Optionally, the connecting wood members that extend between each two respective neighboring primary wood members are arranged 720 in parallel or nearly in parallel, to each other.

Optionally, the connecting wood members that extend between each two respective neighboring primary wood members are perpendicular or nearly perpendicular to the two neighboring primary wood members.

Optionally, each one of the layers is facially attached 750 to one or two neighboring ones of the layers, in rotational orientation perpendicular to the neighboring layers, as described in further detail hereinabove, and illustrated using FIG. 1-3.

Optionally, the layers are facially attached 750 to form a wall, i.e. an article of manufacture to be used as a wall (say an external wall, an internal wall, etc.), a roof, a combination of a wall and a roof, etc., as described in further detail hereinabove.

Optionally, the first exemplary method is a method of manufacture, implemented in an industrial mode, in which articles such as the exemplary articles of FIG. 1-6, are manufactured.

Optionally, at least one of the steps of the first exemplary method is carried out in a construction site, say the facial attachment 750 of the layers (prefabricated in a factory or assembled in the construction site itself).

Figure 8:
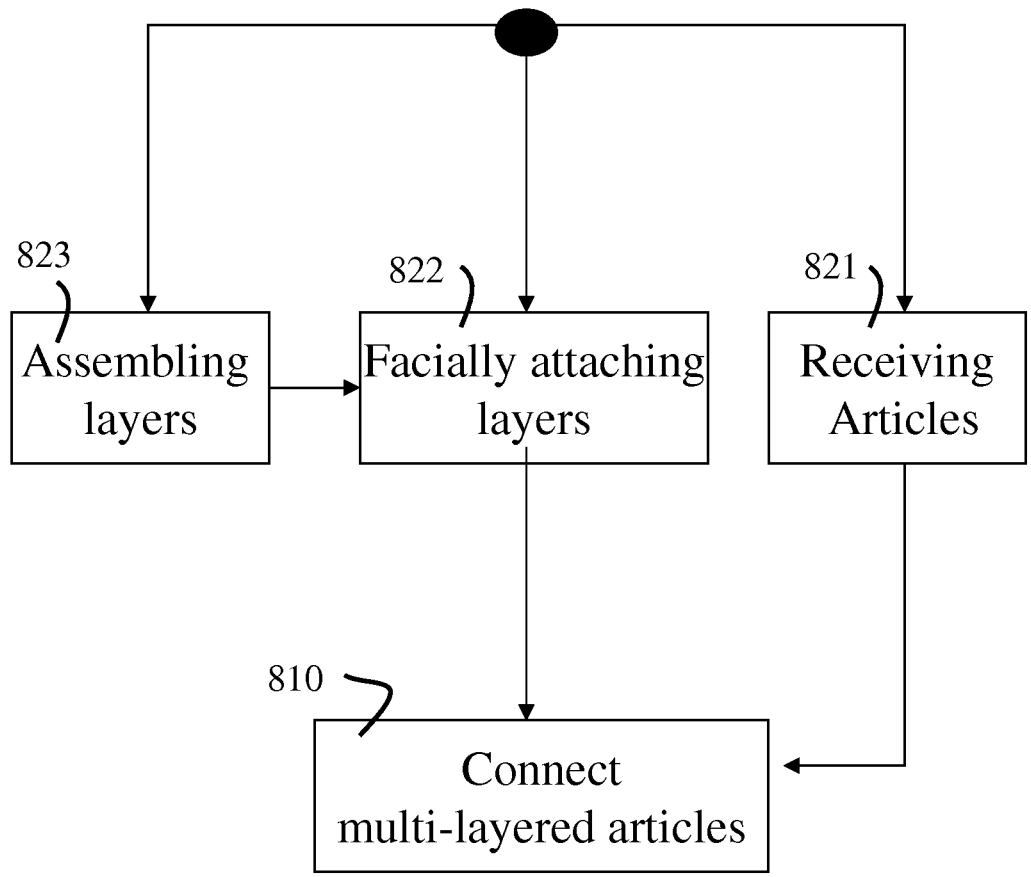
FIG. 8 is a flowchart illustrating a second exemplary method for wood construction, according to an exemplary embodiment of the present invention.

Reference is now made to FIG. 8, which is a flowchart illustrating a second exemplary method for wood construction, according to an exemplary embodiment of the present invention.

A second exemplary method for wood construction, according to an exemplary embodiment of the present invention, is a wood construction method, which may be implemented for building a house or another building, in a construction site.

The second method includes connecting 810 two or more articles of manufacture of the exemplary embodiments of the present invention, as described in further detail hereinabove.

Each one of the articles of manufacture includes a plurality of layers (say three or more layers), facially attached to each other, as described in further detail hereinabove.

Each one of the facially attached layers includes two or more primary wood members.

Each neighboring two of the primary wood members is connected by respective two or more connecting wood members.

Each one of the connecting wood members extends between the respective two neighboring primary wood members, as described in further detail hereinabove.

Each one of the layers is oriented with each primary wood member of the layer in overlap with two or more of the respective connecting wood members of a neighboring one of the layers or neighboring two of the layers, as described in further detail hereinabove.

Each one of the connecting wood members of the neighboring layer, in overlap with the primary wood member, extends between primary wood members connected by the connecting wood member, in direction of extension of the primary wood member in overlap with the connecting wood members, as described in further detail hereinabove.

Optionally, the articles are received 821 at the construction site, as articles prefabricated in a workshop, a carpentry shop, a factory, or another manufacturing site.

Optionally, the layers of each of the articles are facially attached 822, in the construction site, as described in further detail hereinabove.

Optionally, the layers of the articles are assembled 823 in the construction sites, say using steps 720 and 730 of the first method, as described in further detail hereinabove. Once assembled 823, the layers are facially attached 822, in the construction site, as described in further detail hereinabove.

Optionally, a wood building using the exemplary articles of manufacture, of the present invention, may be constructed relatively quickly, even by a person who is not an experienced wood constructor or carpenter.

Optionally, the strength of the exemplary articles, may further allow the person to use wall coverings made of materials known to be problematic with traditional framing methods (due to changes and distortions caused by moisture, wind, temperature changes, etc.), such as plywood or plaster.

Optionally, using the exemplary articles of the present embodiments, there may be introduced flexibility in changes in buildings modularly built, using a method of an exemplary embodiment of the present invention, as well as a much easier and quicker planning and design of wood buildings.

It is expected that during the life of this patent many relevant devices and systems will be developed and the scope of the terms herein, particularly of the terms "Adhesive", "Glue", "Wood member", "Plaster" "Plywood" and "Fastener", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An article of manufacture for wood construction, comprising:
   an odd layer comprising a plurality of primary wood members configured substantially parallel to, distanced from, and not contacting each other; each neighboring two of said primary wood members being connected substantially perpendicularly by a plurality of connecting wood members, each connecting wood member configured substantially parallel to, distanced from, and not contacting each other;
   a plurality of connection joints definable where said primary wood members are connected by said connecting wood members; and
   an even layer having a configuration and a shape substantially the same as said odd layer,
   wherein said article is configured of successive odd and even layers facially attached to each other, said even layers rotatably oriented substantially perpendicular to said odd layers, with respective connection joints of said odd and even layers substantially aligned.

2. The article of claim 1, wherein said layers are attached to form a wall.

3. The article of claim 1, wherein said layers are attached to form a roof.

4. The article of claim 1, wherein said layers are attached using an adhesive.

5. A method for wood construction, comprising the steps of:
   a) configuring an odd layer comprising a plurality of primary wood members configured substantially parallel to, distanced from, and not contacting each other; connecting each neighboring two of said primary wood members substantially perpendicularly by a plurality of connecting wood members, each connecting wood member configured substantially parallel to, distanced from, and not contacting each other;
   b) defining a plurality of connection joints where said primary wood members are connected by said connecting wood members; and
   facially attaching successive odd and even layers, said even layers rotatably oriented substantially perpendicular to said odd layers, with respective connection joints of said odd and even layers substantially aligned.

6. The method of claim 5, further comprising attaching said layers to form a wall.

7. The method of claim 5, further comprising attaching said layers to form a roof.

8. The method of claim 5, further comprising attaching said layers using an adhesive.

9. The method of claim 5, wherein at least said facially attaching of said layers, is carried out in a construction site.

* * * * *